United States Patent [19]
Melber

[11] Patent Number: 4,720,360
[45] Date of Patent: Jan. 19, 1988

[54] DIFFUSED AERATION SYSTEM
[75] Inventor: Milton R. Melber, Salado, Tex.
[73] Assignee: Enviroquip, Inc., Austin, Tex.
[21] Appl. No.: 827,752
[22] Filed: Feb. 10, 1986
[51] Int. Cl.$^4$ .............................................. B01F 3/04
[52] U.S. Cl. ..................................... 261/76; 261/123; 138/44; 210/220
[58] Field of Search .................... 261/123; 138/44–46; 210/220; 261/76

[56] References Cited
U.S. PATENT DOCUMENTS

| | | | |
|---|---|---|---|
| 2,301,296 | 11/1942 | Laurent | 138/44 X |
| 2,625,179 | 1/1953 | Robertson et al. | 138/44 |
| 3,679,187 | 7/1972 | Smith | 261/123 |
| 4,105,721 | 8/1978 | Schliebe | 261/76 |
| 4,178,756 | 12/1979 | Adachi et al. | 138/44 X |
| 4,477,341 | 10/1984 | Schweiss et al. | 261/123 X |
| 4,478,765 | 10/1984 | Tubbs | 261/76 |

*Primary Examiner*—Tom Wyse
*Attorney, Agent, or Firm*—Arnold, White & Durkee

[57] ABSTRACT

An orifice device, which includes fluid guidance structure and a flow restriction, for use in a diffused aeration system for treating polluted wastewater is disclosed. The device is inserted directly into the run of a tee-joint which connects a fluid injection pipe to a fluid manifold. The orifice device is provided with fluid guidance structure to reduce fluid turbulence as the flow of fluid changes direction from horizontal to vertical. The orifice device also is provided with an orifice to backpressure fluid and enhance even distribution of fluid among several injection pipes. The upper exterior of the orifice device is threaded to be engageable with the interior of a threaded tee-joint. The orifice device is removeable in order to facilitate cleaning and maintenance of the aeration system.

9 Claims, 6 Drawing Figures

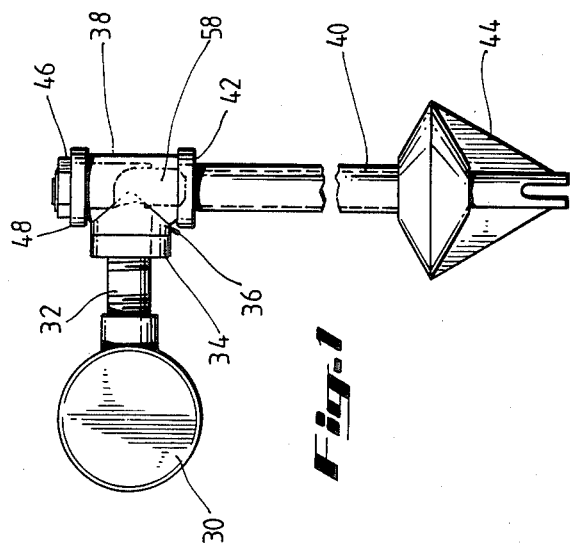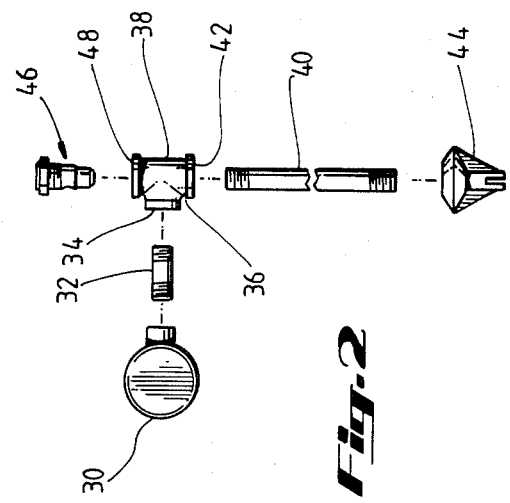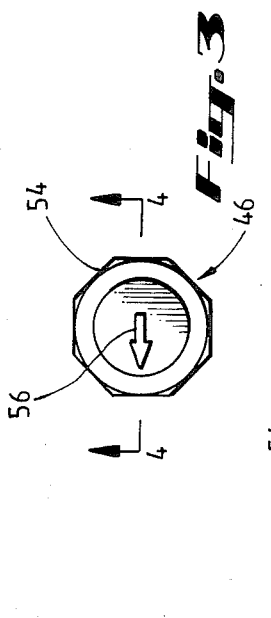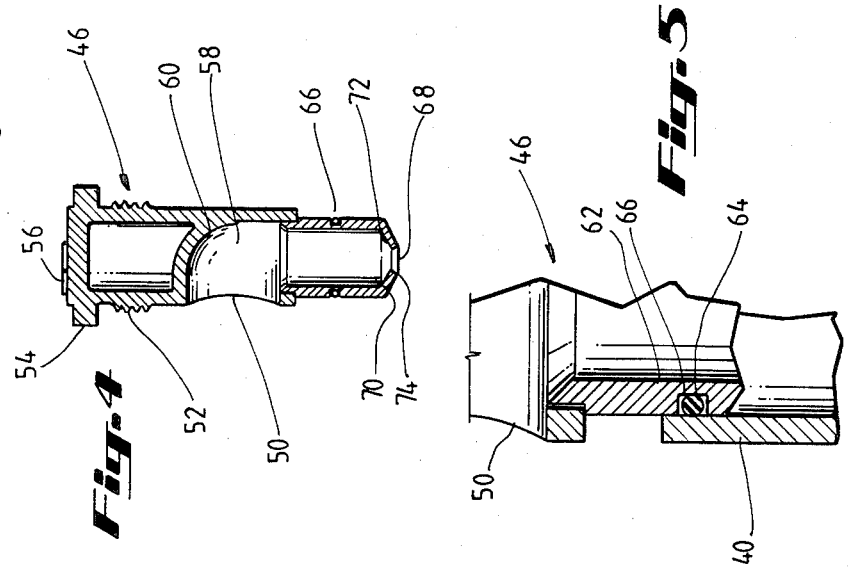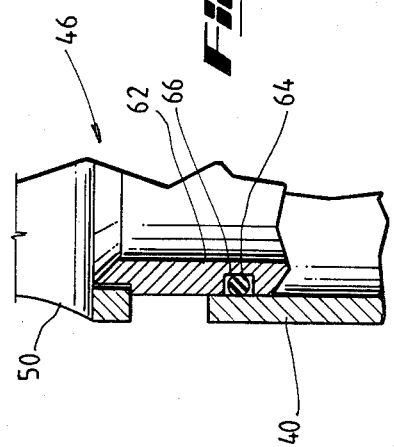

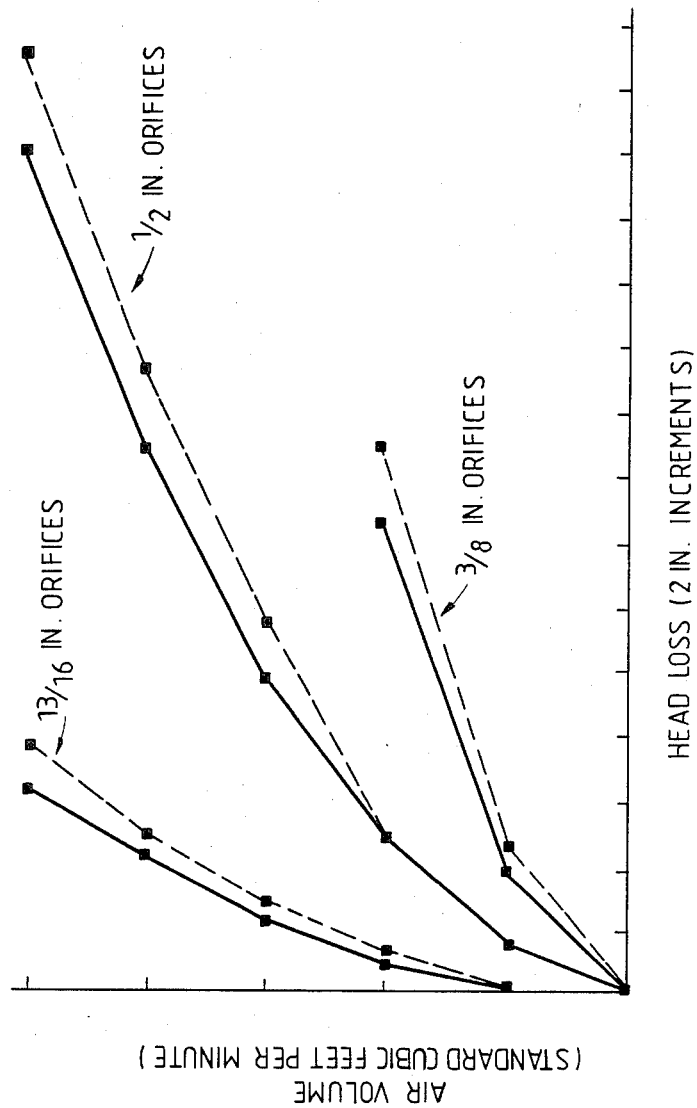

DIFFUSED AERATION SYSTEM

BACKGROUND OF THE INVENTION

This invention generally relates to diffused aeration systems used for treating polluted liquids. More particularly, the invention relates to an orifice device for an aeration system in which a plurality of fluid injection pipes, immersed in a body of polluted liquid, are connected to a fluid manifold while the orifice devices themselves are not so submerged.

In one known aeration system, a horizontal fluid manifold is installed above the body of liquid to be treated. Short sections of pipe or nipples, threaded into the manifold, extend horizontally from the manifold across the surface of the polluted liquid. On to each nipple is threaded an orifice fitting which has an orifice plate clamped between a pair of flanges. One end of a second nipple is threaded into the downstream side of each orifice fitting, and the opposite end is threaded into the side connection of a standard tee-joint fitting. The centerline of the run of the tee-joint (i.e., the section having opposed, open, threaded ends) is vertically disposed and perpendicular to the centerline of the second nipple. A plug is threaded into the upper open end of each tee-joint. A fluid injection pipe, connected to the bottom open end of each tee-joint, extends downwardly from the tee-joint into the polluted liquid. The bottom end of each fluid injection pipe is provided with a diffuser head which facilitates the diffusion of oxygen into the liquid.

In another known aeration system, a third nipple is threaded into the upper open end of the tee-joint, and the top of the nipple is closed by a removeable pipe cap.

In these known aeration systems, removal of the plug or pipe cap sealing the tee-joint at the top of each fluid injection pipe permits access into the interior of the injection pipe for cleaning or maintenance.

During operation, pressurized oxygen-containing gas flows sequentially through the fluid manifold, the series of nipples, the orifice plates and the second nipples, and then through the tee-joints where the flow direction is changed from horizontal to vertical. The gas then flows down the fluid injection pipes, through the diffuser heads, and into the polluted liquid.

As a consequence of their tortuous gas flow paths, known aeration systems have high pressure drops which limit the allowable penetration of the fluid injection pipes into the polluted liquid. The high pressure drops also limit the amount of oxygen that may be diffused into the liquid. In those known systems wherein all the injection pipes penetrate the liquid to a particular depth, the high pressure drops require an increased expenditure of energy to force the gas through the systems and into the polluted liquid.

SUMMARY OF THE INVENTION

According to the present invention, apparatus is provided which substantially decreases the pressure drops described above, thereby permitting the fluid diffusers to be positioned more deeply in the body of polluted liquid. Moreover, the amount of oxygen diffused into the polluted liquid for a given expenditure of energy is thereby increased. Conversely, less energy is required to diffuse a given volume of oxygen into the polluted liquid. The present invention also provides for a greatly simplified aeration system.

According to one aspect of the present invention, a gas manifold is disposed above a body of polluted liquid. A first nipple is formed or threaded into the manifold, so that it extends perpendicularly away from the manifold and horizontally over the liquid. A standard tee-joint is threaded directly onto the first nipple. The tee-joint is positioned so that the centerline of the run of the tee is vertical and perpendicular to the centerline of the first nipple. A fluid injection pipe, connected to the lower open end of the run of the tee, extends downwardly into the liquid and is provided with a diffuser head at its lower end. An orifice device is inserted in and connected to the upper open end of the tee. The first nipple, the tee-joint, the fluid injection pipe, the diffuser head, and the orifice device will be collectively referred to herein as a diffuser line assembly.

In one embodiment of the present invention, the orifice device is threaded downwardly into the tee-joint from the upper open end of the run of the tee. Fluid guidance structure is included in the orifice device to reduce turbulence as the direction of gas flow is changed from horizontal to vertical. The orifice device is provided with an orifice at its lower end to restrict the flow of gas, and a solid surface at its upper end to seal the upper end of the tee-joint. In this embodiment, the orifice device may be readily removed for cleaning or maintenance of the fluid injection pipe.

According to another aspect of the present invention, the orifice device located in each fluid injection pipe facilitates even fluid distribution among the plurality of injection pipes. According to yet another aspect of the present invention, the orifice of each orifice device in the system may advantageously be substantially equal in size.

In operation, pressurized oxygen-containing gas flows through the fluid manifold and through each first nipple. Upon leaving the first nipple, the gas encounters the fluid guidance structure of the orifice device which guides the flow of the gas through a transition from horizontal to vertical. The gas then encounters the orifice at the bottom of the device; it passes through the orifice and flows down the injection pipe and through the diffuser head. Since the gas is back-pressured substantially only once (in the orifice) before it is allowed to escape through the diffuser head, the pressure of the gas flowing down the injection pipe is greater than in known prior art systems, and therefore the diffuser head may be positioned more deeply into the liquid. Consequently, the amount of gas diffused into the liquid may be increased substantially without increasing the pressure of the gas flowing through the gas manifold. Conversely, less energy is required to cause the gas to flow through the aeration system than is required in a system using the known orifice fittings.

According to another aspect of the present invention, the assembly and material costs of aeration systems are reduced by eliminating the need for several pipe fittings and pipe nipples.

According to yet another aspect of the present invention, the orifice device may be formed from a variety of materials, including plastic resins. The choice of materials makes possible further cost savings.

BRIEF DESCRIPTION OF THE DRAWINGS

The invention will be described with reference to the accompanying drawings wherein like members bear like reference numerals.

FIG. 1 is a side view of an aeration system diffuser line assembly in accordance with the present invention.

FIG. 2 is an exploded view of the diffuser line assembly of FIG. 1.

FIG. 3 is a top view of an orifice device of the diffuser line assembly of FIG. 1.

FIG. 4 is a sectional view of the orifice device taken along the line 4—4 of FIG. 3.

FIG. 5 is a sectional view of a sealing structure for the orifice device and the inner surface of an air injection pipe in accordance with the present invention.

FIG. 6 is a graph of Air Volume versus Head Loss comparing embodiments of the present invention with known prior art apparatus having similar orifice sizes.

DESCRIPTION OF THE PREFERRED EMBODIMENTS

Referring to the drawings, and in particular to FIGS. 1 and 2, there is shown a fluid manifold 30 positioned to extend horizontally over a body of polluted water. One end of a nipple 32 engages the manifold 30, and the other end engages the side or third port 34 of a tee-joint 36. The tee-joint 36 is positioned so that the centerline of the run of the tee-joint 38 of the tee-joint 36 is vertically disposed, and is perpendicular to the centerline of the nipple 32. A fluid injection pipe 40 engages the lower end port 42 of the run of the tee-joint 38. The bottom end of fluid injection pipe 40 is provided with a diffuser head 44. An orifice device 46 engages the top end port 48 of the run of the tee-joint.

Referring now to FIGS. 2-4, the orifice device 46 includes an entry port 50. The orifice device 46 is positioned in the tee-joint 36 such that the entry port 50 is substantially concentric with the passageway of the nipple 32. The upper exterior end of the orifice device 46 has threads 52 which engage the interior threads of the run of tee-joint 38.

In the illustrated embodiment, the orifice device 46 is also provided with a hex-head 54 so that the orifice device 46 may be wrenched into, and out of, the tee-joint 36.

In the embodiment illustrated in FIG. 3, the orifice device 46 includes an arrow 56 which indicates the rotational orientation of the entry port 50. During assembly, the arrow 56 is pointed toward the longitudinal centerline of the nipple 32 so that the entry port 50 is aligned with the passageway of the nipple 32.

Referring now to FIG. 4, the orifice device 46 includes a smoothly curving channel 58. The channel 58 helps to reduce fluid turbulence as the direction of fluid flow is changed from horizontal to vertical. The channel 58 includes an upper surface 60 which is preferably in the shape of a 90 degree arc formed about the intersection of the centerlines of the orifice device 46 and the nipple 32.

In the embodiment illustrated in FIG. 4, a flow restricting orifice 68 is included at the end 70 of the orifice device 46. Preferably, the interior surface of the end 70 is conically shaped with the small end of the cone forming the orifice 68. To further enhance fluid flow, the diameter of the orifice 68 tapers through the width of the material at the end 70 of the orifice device 46. The orifice 68 is defined by a region having a smallest orifice diameter and a region having a largest orifice diameter, said regions being spaced one from another. The smallest orifice diameter is formed by the interior surface 72 of the end 70, while the largest orifice diameter is formed by the exterior surface 74 of the end 70.

Referring now to FIG. 5, sealing structure 62 is interposed between the orifice device 46 and the fluid injection pipe 40. Preferably the sealing structure 46 includes an O-ring 64 positioned in a gland 66 formed on the exterior of the orifice device 46.

Referring now to FIG. 6, depicted in graphic form is a comparison of the Head Loss experienced by both a known aeration system and various embodiments of an aeration system in accordance with the present invention. The comparison is over a range of Air Volumes passing through the systems. Specifically, Head Loss for several orifice devices according to the present invention are compared to known orifice fittings and brass tee-joint assemblies equipped with orifice plates. The orifices in the comparisons were 13/16 inch, ½ inch, and ⅜ inch in diameter. Head Loss measurements were taken with manometers located before (upstream) and after (downstream) apparatus according to the present invention and known orifice fittings and tee-joint combinations.

As depicted in FIG. 6, greater head losses were recorded for the known aeration systems than were recorded for aeration systems employing alternate embodiments of the present invention. For example, as depicted in FIG. 6, a known aeration system using a brass tee-joint and an orifice fitting containing an orifice plate having a ½ inch orifice produced a 29 inch Head Loss when 25.07 standard cubic feet of air per minute passed through it. On the other hand, an aeration system according to the present invention and having a ½ inch orifice produced only 26 inches of Head Loss when the same rate of air passed through it. Similarly, a known aeration system having a known orifice fitting with a ⅜ inch orifice in an orifice plate had approximately 17.0 inches of Head Loss when 10 standard cubic feet of air per minute passed through it, while apparatus according to the present invention having a ⅜ inch orifice produced approximately 14.3 inches of Head Loss when the same rate of air passed through it. As will be apparent to those skilled in the art, lower Head Loss is indicative of greater aeration system efficiency.

A more specific understanding of the advantages of an aeration system incorporating an orifice device in accordance with the present invention will be apparent from the following example. Data obtained from field testing an aeration system incorporating an embodiment of an orifice device, and data obtained from a known system using a standard brass tee-joint and orifice fitting with an orifice plate, have been used as the foundation for the following example. Basic assumptions concerning quantities and treatment standards, apparent to those skilled in the art, have been incorporated into the comparison. The comparison involves the calculated daily operating costs of treating one million gallons of domestic wastewater using the two systems, each equipped with a ½ inch orifice.

In general, one pound of oxygen is required to remove one pound of BOD-5 (five day biological oxygen demand) from domestic wastewater. It will be understood by one skilled in the art that BOD-5 is a standard rating of the oxygen demand of polluted liquids. Municipal treatment plants are generally designed under the assumption that the polluted water will contain 200 parts per million of BOD-5. To supply the required oxygen to meet this demand, 1480 standard cubic feet per minute of air must be injected into the polluted liquid for each one million gallons of wastewater each day. In a system having 99 injection pipes inserted 13.5 feet into the liquid, the air flow through the fluid manifold to the known system would have to be at a pressure of 6.24 PSI in order to diffuse the required amount of oxygen into the liquid. In contrast, air flowing through the fluid manifold to injection pipes having apparatus according to the present invention would have to be at a pressure of only 6.17 PSI to diffuse the required amount of oxygen into the liquid. Assuming a blower supplying pressurized gas to the manifold operates at 55 percent efficiency, 68.01 brake horsepower would be needed to provide sufficient pressure to the known aeration system, while the aeration system of the invention would need only 67.44 brake horsepower to supply the required pressure. Assuming the cost of electricity at a rate of $0.08 per kilowatt hour, this represents a savings of $299.00 per year per million gallons of wastewater treated daily.

Ordinarily, 10,000 people will generate about one million gallons of wastewater each day. It is readily apparent that the use of an aeration system according to the present invention makes possible significant savings in the treatment cost of wastewater. For a community of three million people, on the average generating about 300 million gallons of wastewater each day, savings of some $89,700 a year in electrical power costs alone is possible. Add to this the additional savings in materials, assembly and maintenance costs described earlier, and it is apparent that the present invention results in significant cost saving over known prior art systems.

The principles, preferred embodiments and modes of operating the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. An orifice device, adapted for use in an aeration system which includes at least one tee-joint, said tee-joint having first and second ports disposed at opposite ends of a vertically disposed run of the tee-joint and a third port disposed intermediate said first and second ports, said third port having a longitudinal axis disposed essentially perpendicular to the run of the tee-joint, said orifice device comprising:

an upper cylindrical member and a lower cylindrical member, each adapted to be received by one of said first and second ports;

said upper cylindrical member having an upper end and a lower end, fluid guidance structure and a longitudinal wall defining an entry port to said fluid guidance structure, said entry port being adapted to be in fluid communication with said third port of said tee-joint and said fluid guidance structure being configured to direct the flow of fluid entering said upper cylindrical member from said entry port to said lower cylindrical member, said fluid guidance structure essentially defining a curving surface substantially in the shape of a 90 degree arc about the intersection of the centerline of said upper cylindrical member and an axis adapted to be substantially coincident with said longitudinal axis of said third port of said tee-joint;

said upper end of said upper cylindrical member further comprising a plug adapted to seal said one of said first and second ports of said run of the tee-joint, said upper end being provided with structure adapted to wrench said upper cylindrical member into, and out of, said tee-joint, said upper end further including means for indicating the orientation of said entry port; and said lower cylindrical member having an upper end and a lower end, said upper end being fluidly engageable with said lower end of said upper cylindrical member, said lower end of said lower cylindrical member having a flow restriction, and said lower cylindrical member having a channel to direct fluid entering said lower cylindrical member from said upper cylindrical member to said flow restriction, wherein said channel tapers as it approaches said flow restriction.

2. The device according to claim 1 wherein said upper cylindrical member and said lower cylindrical member are permanently joined together.

3. Apparatus for use in aerating a body of liquid, comprising:

a fluid manifold positioned substantially horizontally over the surface of said liquid;

a plurality of conduits spaced along said manifold and extending substantially laterally over said liquid to conduct fluid from said manifold;

a separate tee-joint, having a side port and an end port at each end of the run of the tee-joint, positioned opposite each said conduit such that said run of the tee-joint is substantially vertically disposed and substantially perpendicular to the centerline of its respective conduit, said side port of each said tee-joint being connected to its respective conduit;

a separate fluid injection pipe connected at one end to the lower end port of each said tee-joint and extending downwardly into said liquid from said lower end port;

a separate fluid diffuser head attached to the lower end of each said fluid injection pipe;

a separate orifice device positioned in said run of each said tee-joint, said device comprising an upper cylindrical member and a lower cylindrical member, said upper cylindrical member having an upper end, a lower end, and a longitudinal side-wall having an entry port, said upper cylindrical member having fluid guidance structure configured to direct the flow of fluid entering said upper cylindrical member from said side port of said tee-joint through said entry port of said longitudinal side-wall of said upper member, to said lower cylindrical member, said fluid guidance structure essentially defining a curving surface substantially in the shape of a 90 degree arc about the intersection of the centerline of said upper cylindrical member and the centerline of said side port of said tee-joint;

said upper end of said upper cylindrical member further comprising a plug adapted to seal the upper end port of said run of the tee-joint, said upper end being provided with structure adapted to wrench said upper cylindrical member into, and out of, said tee-joint, said upper end further including means for indicating the orientation of said entry port relative to said side port of said tee-joint when said orifice device is positioned within said tee-joint; and said lower cylindrical member having an upper end and a lower end, said upper end being fluidly engageable with said lower end of said upper cylindrical member, said lower end of said lower cylindrical member having a flow restriction having a center, said center being located substantially along the centerline of said run of the tee-joint, said lower cylindrical member having a channel to direct fluid entering said lower cylindrical member from said upper cylindrical member to said flow restriction, wherein said channel tapers as it approaches said flow restriction.

4. The apparatus according to claim 3 wherein the entry port in at least one of said orifice devices has a first diameter, the conduit in fluid communication with said entry port has a first inner diameter, and said first diameter is at least as large as said first inner diameter.

5. The apparatus according to claim 3 wherein the exterior of at least one of said orifice devices threadly engages the interior of at least one of the tee-joints.

6. The apparatus according to claim 3 wherein at least one of said flow restrictions defines an orifice.

7. The apparatus according to claim 6 wherein said orifice is defined by a first face disposed nearer said upper end port, and a second face disposed nearer said diffuser head, said first and second faces each defining an end diameter of said orifice wherein said diameter defined by said first face is smaller than said diameter defined by said second face.

8. The apparatus according to claim 3 wherein said upper cylindrical member and said lower cylindrical member are permanently joined together.

9. The apparatus according to claim 3 wherein said orifice device further includes structure to seal said lower end port of said run of the tee-joint.

* * * * *